R. Deering, Sr.
Dressing Stone.

Nº 11,746.  Patented Oct. 3, 1854.

UNITED STATES PATENT OFFICE.

RICHARD DEERING, SR., OF LOUISVILLE, KENTUCKY.

CIRCULAR STONE-SAW.

Specification of Letters Patent No. 11,746, dated October 3, 1854.

*To all whom it may concern:*

Be it known that I, RICHARD DEERING, Sr., of Louisville, in Jefferson county and State of Kentucky, have invented a certain new and useful Improvement in Machinery for Cutting and Dressing Stone; and I do hereby declare the following to be a full, clear, and exact description thereof, reference being had to the accompanying drawing, which forms part of this specification, and in which—

Figure 1:
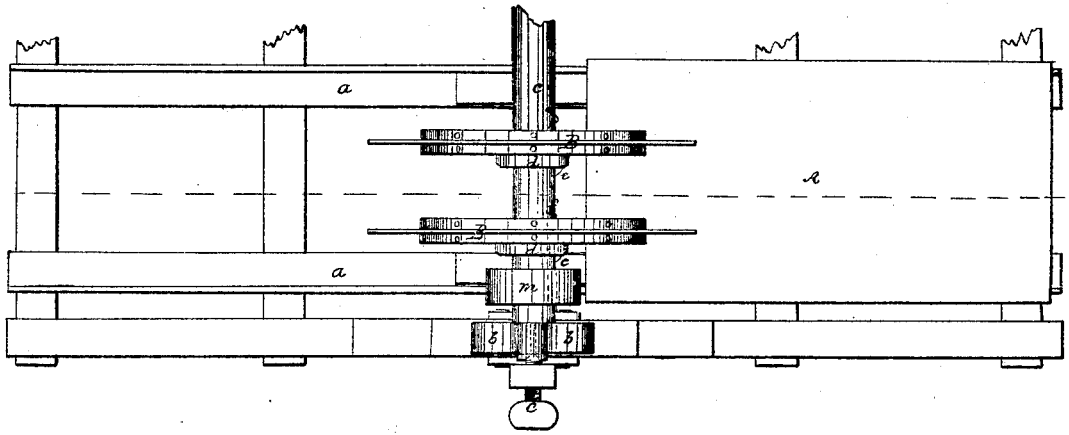
Figure 2:
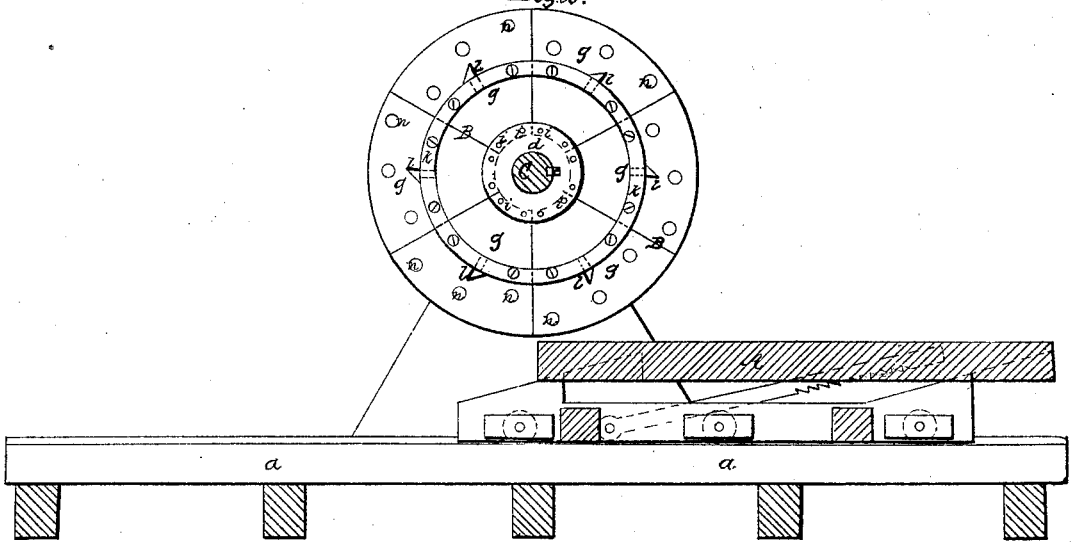

Figure 1, represents a plan or top view, showing two saws on the shaft, which is broken off at one end, as is also the framing, to indicate that it may be extended to any required length, with any number of saws arranged thereon. Fig. 2 is a vertical longitudinal section, taken as indicated by the line $x\ x$ in Fig. 1.

In the operation of the machinery represented in the accompanying drawing, the stone to be cut or dressed, is placed upon a longitudinal traveling bed or table (A), that has reciprocating motion given to it, by any suitable mechanical means, under a rotary cutter or cutters (B). The bed or table (A) may run on rails ($a$) either by rollers or slides resting thereon, and should be made capable, of being raised or lowered to adjust the stone to its proper elevation for the cut; this may be done by double inclined slides, connecting the bed with those portions which rest on the rails, as represented in Fig. 2, or it may be done in any other appropriate manner.

The cutters (B) are revolving disks of sheet metal, plain on their periphery, and in this respect and so far as concerns the superficial or general character of their operation, they differ but little from other rotary stone cutters, but they differ materially in other respects, as will hereinafter be made more apparent. The cutters are hung on a horizontal shaft (C), that is situated in a transverse direction over the traveling bed or table, at a suitable height therefrom, according to the diameter of the cutters. This shaft rests and turns on antifriction rollers ($b$) at either end, and is restrained from lateral play, and collar friction, by center screws ($c$) at either end, by which arrangements the greatest freedom of running is insured to the shaft, and power economized in driving the cutters.

The shaft may be driven by belt on the pulley ($m$) or any other suitable manner from the prime mover which may be steam, water, or other propelling agent. On this shaft, which may be of considerable length, the hubs ($d$) which carry the disk cutters (B) are secured by keys ($e$), that fit in a planed key seat ($f$) cut in the shaft, for the whole of its length between the bearings, if desired, to admit of the cutters being adjusted, at any desired point or distance from each other, and along the shaft, to meet the various requirements in the work to be done. The disk cutters, which in a general way would be of very large diameter, and be caused to run at a rapid velocity, are made up of sectors ($g$) of a circle, sufficient in number to form a perfect disk or ring, much in like manner to the construction of other large circular saws or cutters, but differing therefrom in this important respect, viz. The sectors ($g$) are so cut out of a plate or sheet of rolled metal, that the fibers of the metal, run in parallel lines lengthwise of the sector; that is, parallel with a radial line, bisecting the arc of the sector, instead of indiscriminately cutting the sectors out of the plate, without reference to the run of the fiber, as has heretofore been usual.

By thus constructing the several sectors ($g$), in the disk (B), in no one point on the periphery of the disk, will the fibers be presented laterally, or otherwise in the direction of their length, to effect the cut; but in every point on the circumference, they will present a granular or end fiber of the iron, which gives a much harder, sharper, and more regular cut, than if the periphery of the disk were made up of a mixed disposition or arrangement of the fibers, some being parallel to the chord of the arc of the sector, while others are radial and parallel thereto, in which last named case, that portion of the disk in which the fiber of the metal is presented laterally to the cut, would cut far less keenly, while the wear would be much greater, than at those portions where the grain or fiber of the metal is presented endwise to the cut, and consequently the disk would soon lose its rotundity, the retention of which is so important to it as a cutter; and in disks of large size, running at great velocities, the importance of this improvement, in the construction of them, is made still more obvious; a constant supply of sand and water, must be applied to the stone about the disk, while cutting, as is usual with all stone sawing apparatus; and in order to facilitate the passage of the sand, from the top of the stone to the cutting edge of the disk, the disk may be perforated, at irregular distances from the periphery, as shown at (n) Fig. 2.

The several sectors (g) making up the disk, are held to the hub (d) and drawn tight together, to make a compact and perfect disk, by letting them into a deep groove, cut centrally around the periphery of the hub, into which the sectors fit tight, and bolts (i) are passed through the hub and sectors, the holes in the sectors through which the bolts pass being draw bored. And to stiffen the sectors, and prevent them playing laterally, or vibrating, any number of metal rings, may be arranged on either face of the sectors, between the hub and the periphery, and bolts be passed through the rings and sectors; the outer one (k) of these rings, on either side, may serve as a gage to regulate the greatest depth of cut, and may be provided with molding cutters or tools (l), projecting from their circumference at different points, all around, by which means the stone on the traveling bed, is not only divided lengthwise by the disk, but the two stones thus made, will each simultaneously have a molding cut on their one edge or border; or if it be desired to cut a molding on both edges of each stone, this may simultaneously be done, by setting the next adjoining revolving cutter, in proper proximity on the shaft, to the first disk cutter, there being as before observed any number of disks on the same shaft, and any number of traveling beds, to draw or pass several stones at a time, under the several revolving disks (B). On the principle hereinbefore described, every variety of stone cutter presenting a continuous or endless cutting face or edge, may be constructed, as for instance cylinder or tub saws, for cutting round holes through the center of a block of stone, also cutters for dressing columns, &c.

What I claim as new and useful and desire to secure by Letters Patent is—

Constructing a circular stone saw of sectors of a circle, cut out of rolled or sheet metal, in such manner, and in order that the fiber of the metal may be made to run radially through the center or thereabouts of each sector and thus present an end fiber cutting edge all around its periphery, substantially as herein specified.

In testimony whereof, I have hereunto subscribed my name this 2nd day of Augt. 1854.

RICHARD DEERING, Senr.

Witnesses:
R. W. VARDEN,
WM. M. SMITH.